United States Patent [19]
Kikinis et al.

[11] Patent Number: 5,774,734
[45] Date of Patent: Jun. 30, 1998

[54] VARIABLE-VOLTAGE CPU VOLTAGE REGULATOR

[75] Inventors: Dan Kikinis, Saratoga; Pascal Dornier, Sunnyvale, both of Calif.

[73] Assignee: Elonex I.P. Holdings, Ltd., London, United Kingdom

[21] Appl. No.: 753,262

[22] Filed: Nov. 12, 1996

Related U.S. Application Data

[63] Continuation of Ser. No. 319,817, Oct. 7, 1994, abandoned.

[51] Int. Cl.[6] ................................................. G06F 1/26
[52] U.S. Cl. ...................... 395/750.01; 323/282; 323/351
[58] Field of Search ............. 395/750.01; 323/281–282, 323/351–354

[56] References Cited

U.S. PATENT DOCUMENTS

| | | | |
|---|---|---|---|
| 4,128,771 | 12/1978 | Domenico | 307/52 |
| 4,438,498 | 3/1984 | Sekel et al. | 364/483 |
| 4,509,128 | 4/1985 | Coppola et al. | 364/483 |
| 4,593,348 | 6/1986 | Tewesmeier | 363/85 |
| 4,810,909 | 3/1989 | Asazawa | 307/491 |
| 5,167,024 | 11/1992 | Smith et al. | 395/375 |
| 5,294,879 | 3/1994 | Freeman et al. | 322/23 |
| 5,325,071 | 6/1994 | Westmoreland | 330/282 |
| 5,355,077 | 10/1994 | Kates | 323/224 |
| 5,381,115 | 1/1995 | Timmons et al. | 330/279 |
| 5,426,395 | 6/1995 | Cygan | 330/207 |
| 5,429,959 | 7/1995 | Smayling | 437/34 |
| 5,481,730 | 1/1996 | Brown et al. | 395/750 |
| 5,481,732 | 1/1996 | Shahbazi | 395/750 |

*Primary Examiner*—Ayaz R. Sheikh
*Assistant Examiner*—Sumati Lefkowitz
*Attorney, Agent, or Firm*—Donald R. Boys

[57] ABSTRACT

An integrated CPU has an on-board switching voltage regulator with an electrically-erasable programmable read-only memory electronically accessible for storing a feedback reference coefficient for control. In further embodiments, output voltage is tuned via a second EEPROM storing an electronically accessible value in concert with a solid-state resistor ladder. In other embodiments, signals on interrupt lines to the CPU are monitored to provide a prewarning of impending activity by the CPU requiring dramatically increased current flow. In yet other embodiments, solid state circuitry is provided to reduce or eliminate capacitors used for dealing with input current surges to the CPU.

7 Claims, 7 Drawing Sheets

5,774,734

VARIABLE-VOLTAGE CPU VOLTAGE REGULATOR

CROSS REFERENCE TO RELATED APPLICATIONS

This is a continuation of application Ser. No. 08/319,817 filed Oct. 07, 1994, now abandoned.

FIELD OF THE INVENTION

The present invention is in the area of general-purpose computers such as desktop computers and portable computers, and pertains in particular to supplying regulated electrical power to central processing units (CPUs) and other computer elements.

BACKGROUND OF THE INVENTION

In the development of power supplies and power management for computer systems, as in most technologies, new concepts and products bring with them new problems, and sometimes older problems are exacerbated. Supplying power to CPUs on computer motherboards is a case in point.

As CPUs have gotten faster and more powerful, they have also increased in load requirements and in total power consumed. Moreover, efforts have been made to reduce the voltage required for microprocessors used in and for CPUs. At lower voltage, such as 3.3 volts now required by some commercially available microprocessors, instead of the traditional 5 volts, voltage regulation becomes more important.

Voltage regulation is more important with newer microprocessors also because of the higher power, hence higher current, and the speed with which events transpire in modern computers. A high-power microprocessor suddenly activated, with immediate processing activity as well, generates a relatively high rate of change of current with respect to time, which can (and does) seriously effect the voltage supplied, unless adequate steps are taken to avoid or manage the transient circumstances.

In current art, there are three fundamental implementations of variable-voltage CPU voltage regulators:

1. Regulator is power supply. This implementation in not accurate, its cross-regulation is not good, and on line losses are too high.
2. Line regulator on motherboard. This method is cost-effective, but efficiency is low and reaction speed is poor.
3. Switching regulator on motherboard. Efficiency improves, but the cost is high and reaction speed remains poor.

FIG. 1 shows a voltage regulator and dual-voltage CPU in current technology. A power source (the power supply unit) supplies 12-volt and 5-volt output. A 5-volt CPU uses power directly from the PSU. A 3.3-volt CPU requires conversion through the voltage regulator. In all current art, the best accuracy without manual adjustment is 3% tolerance increases the cost unacceptably and needs continual manual adjustment-not acceptable requirements in a personal computer. FIG. 3 shows details of a switching voltage regulator chip with a resistor or potentiometer, as used in current art.

What is clearly needed is improved methods and apparatus for regulating voltage to CPUs to improve regulation, control line losses, improve reaction time (speed), and to improve efficiency.

SUMMARY OF THE INVENTION

In a preferred embodiment of the present invention, a switching voltage regulator has an electrically eraseable programmable read-only memory unit (EEPROM or $E^2$) for storing a coefficient for feedback loop voltage regulation. The coefficient is adjusted by clocking a serial data stream into a register until a desired value for the feedback coefficient is reached, then storing the value in the EEPROM by means of an input line.

In another embodiment, the adjustment potentiometer used in prior art devices is replaced by an external $E^2$ and a resistor ladder to adjust output voltage.

In various embodiments, regulator apparatus according to the invention is implemented on a motherboard, in a multi-chip CPU package, and integrated in a single chip CPU. There are also several embodiments to deal with current surges, reducing or eliminating capacitors conventionally required. In yet another embodiment, the voltage regulator receives a pre-warning based on a wakeup mechanism according to the invention.

The invention provides vastly improved efficiency and regulation, reaction time, reduced line losses, and reduced probability of failure under rapidly changing circumstances, than may be found in current art.

DESCRIPTION OF THE PREFERRED EMBODIMENTS

Figure 1:
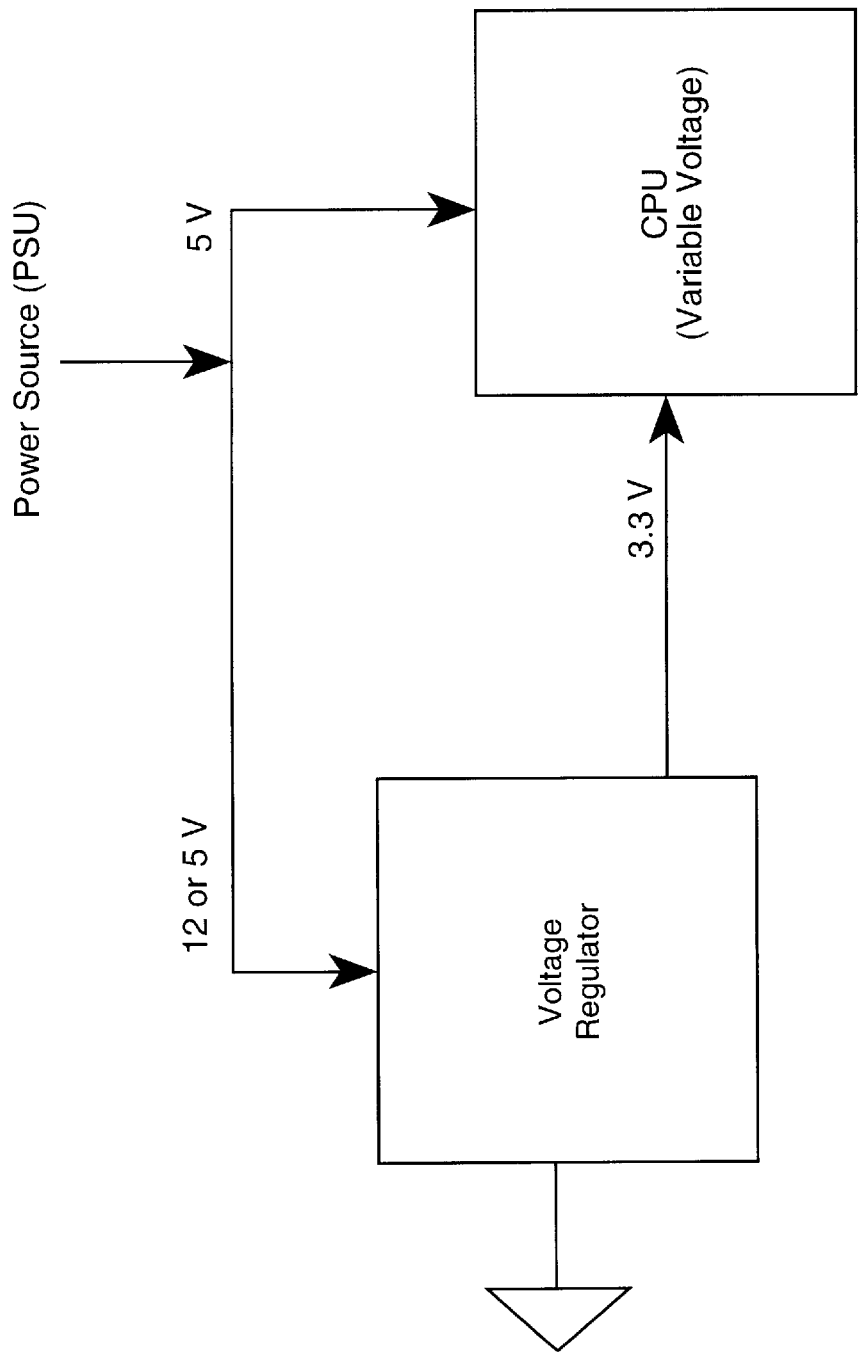
FIG. 1 is a block diagram of a CPU voltage regulator in current art.
Figure 2:
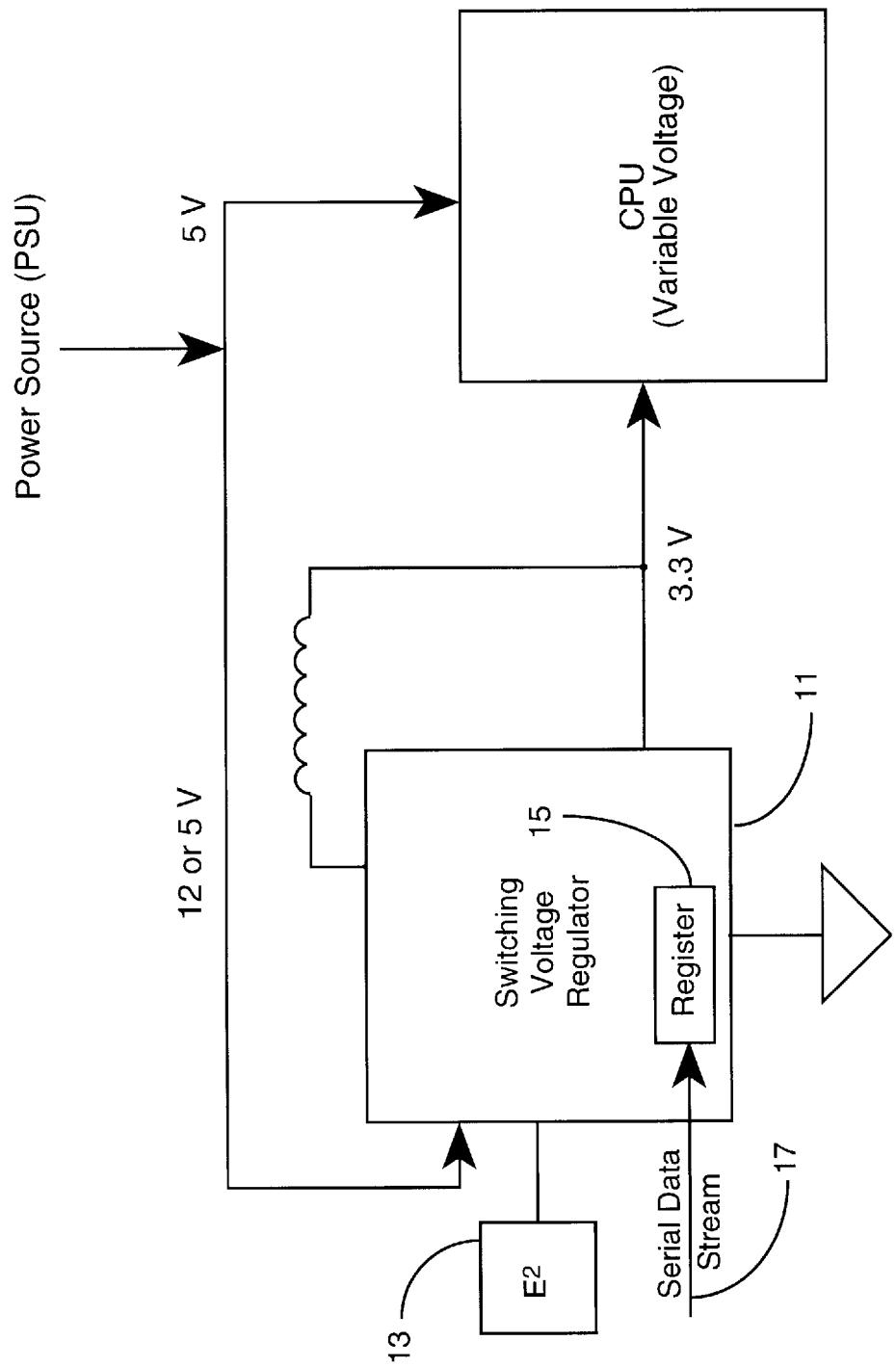
FIG. 2 is a block diagram of a CPU voltage regulator according to an embodiment of the present invention.

FIG. 2 shows a switching voltage regulator 11 with an erasable EPROM ($E^2$) 13 that holds the coefficient for feedback loop voltage regulation. To adjust the output value of a regulator, a serial data stream 17 can be clocked into register 15 until the desired value is obtained. The stored value can be read permanently and is easily changed again, if required, without manual adjustment.

Figure 3:
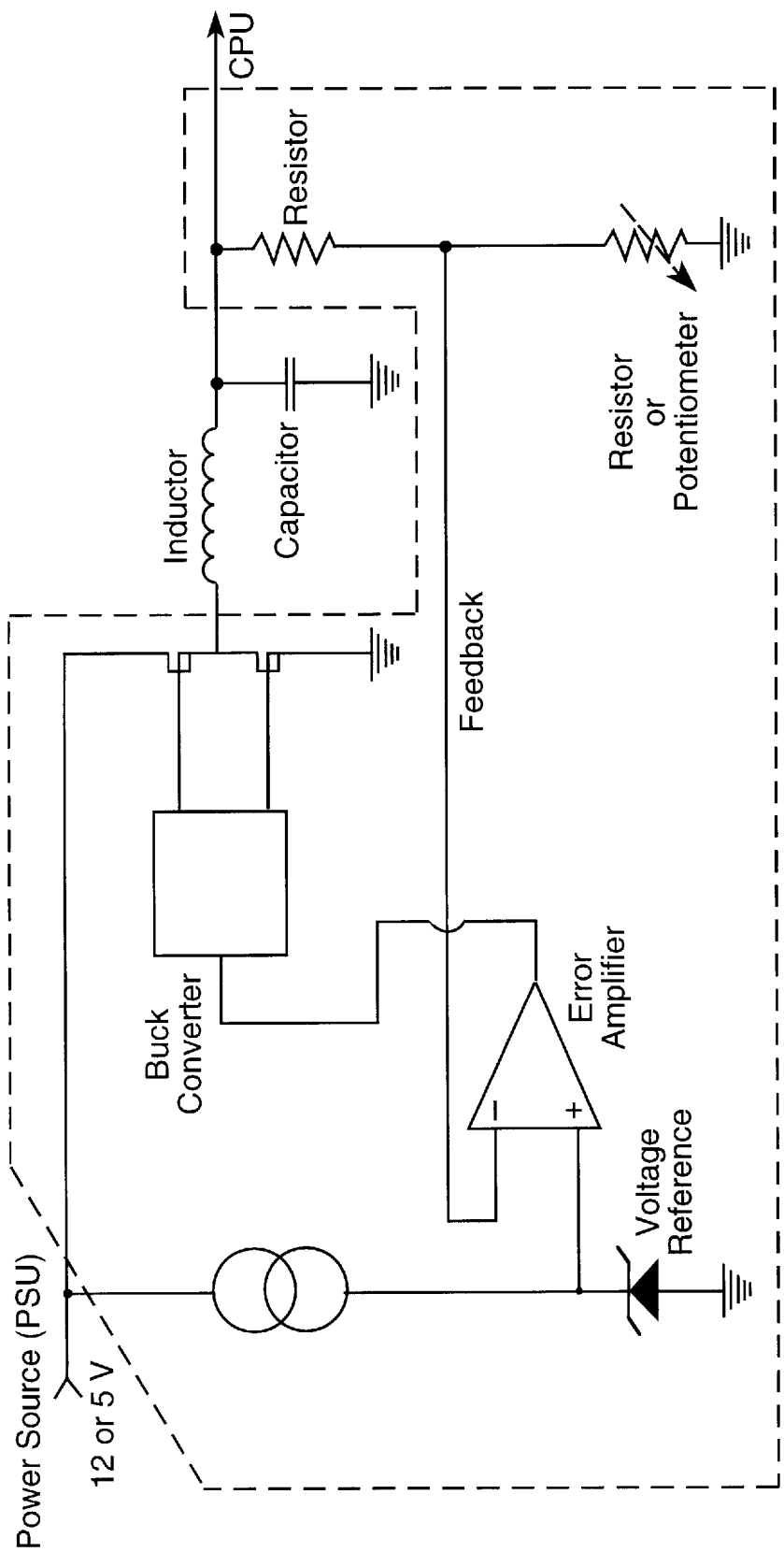
FIG. 3 is a schematic of a switching voltage regulator chip with a resistor or potentiomenter as used in current art.
Figure 4:
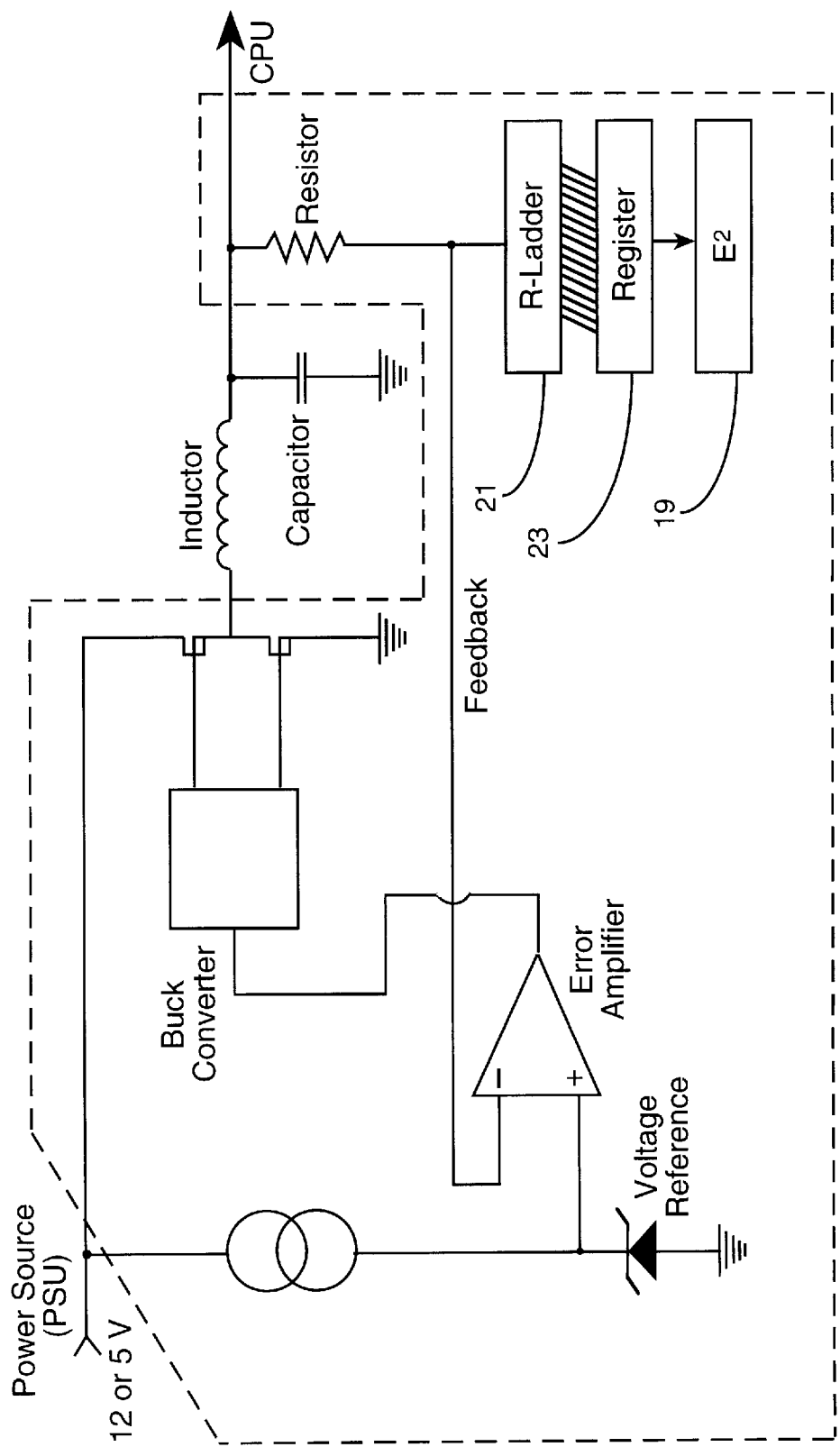
FIG. 4 is a partly schematic diagram of a CPU voltage regulator replacing the current art potentiometer of the regulator of FIG. 3 with an external EEPROM and a resistor ladder.

In FIG. 4, the potentiometer of FIG. 3 is replaced by an external $E^2$ 19 and an R-Ladder 21 to adjust the output voltage. Data and clock values are input to register 23 upon system initialization. The circuit can be tuned for optimal voltage for the CPU, and then the $E^2$ is programmed.

This circuit may be implemented on a motherboard, in a multi-chip CPU package, or integrated in a single-chip CPU. It has several different enhancements to reduce or eliminate the capacitors required to deal with the current surge that occurs when the CPU goes from idle (typically in the milliampere range) to active (typically in a range of multiple amperes) in approximately 100 ns.

Figure 5:
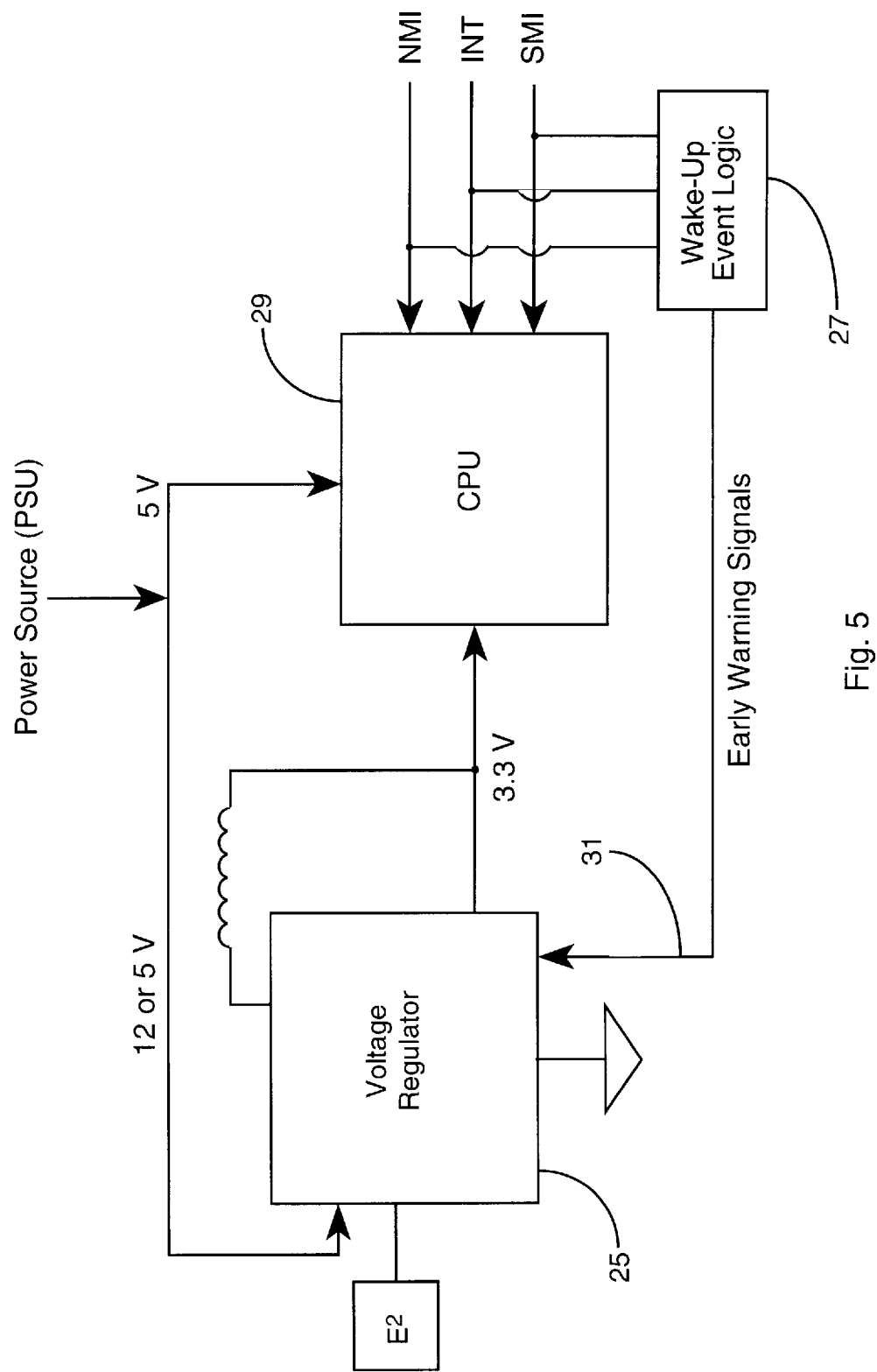
FIG. 5 is a block diagram of an enhanced embodiment of the present invention showing a prewarning system based on a wakeup mechanism.

FIG. 5 shows the first enhancement. Voltage regulator 25 receives a prewarning based on a wake-up mechanism 27. Signals on interrupt lines (NMI, INT, SMI) to CPU 29 are sensed and combined with some logic (e.g., PAL). The resulting lines send a warning on path 31 to voltage regulator 25 of imminent activity by the CPU with dramatically increased current requirements. Thus the voltage regulator can take countermeasures in anticipation of CPU activity.

Figure 6:
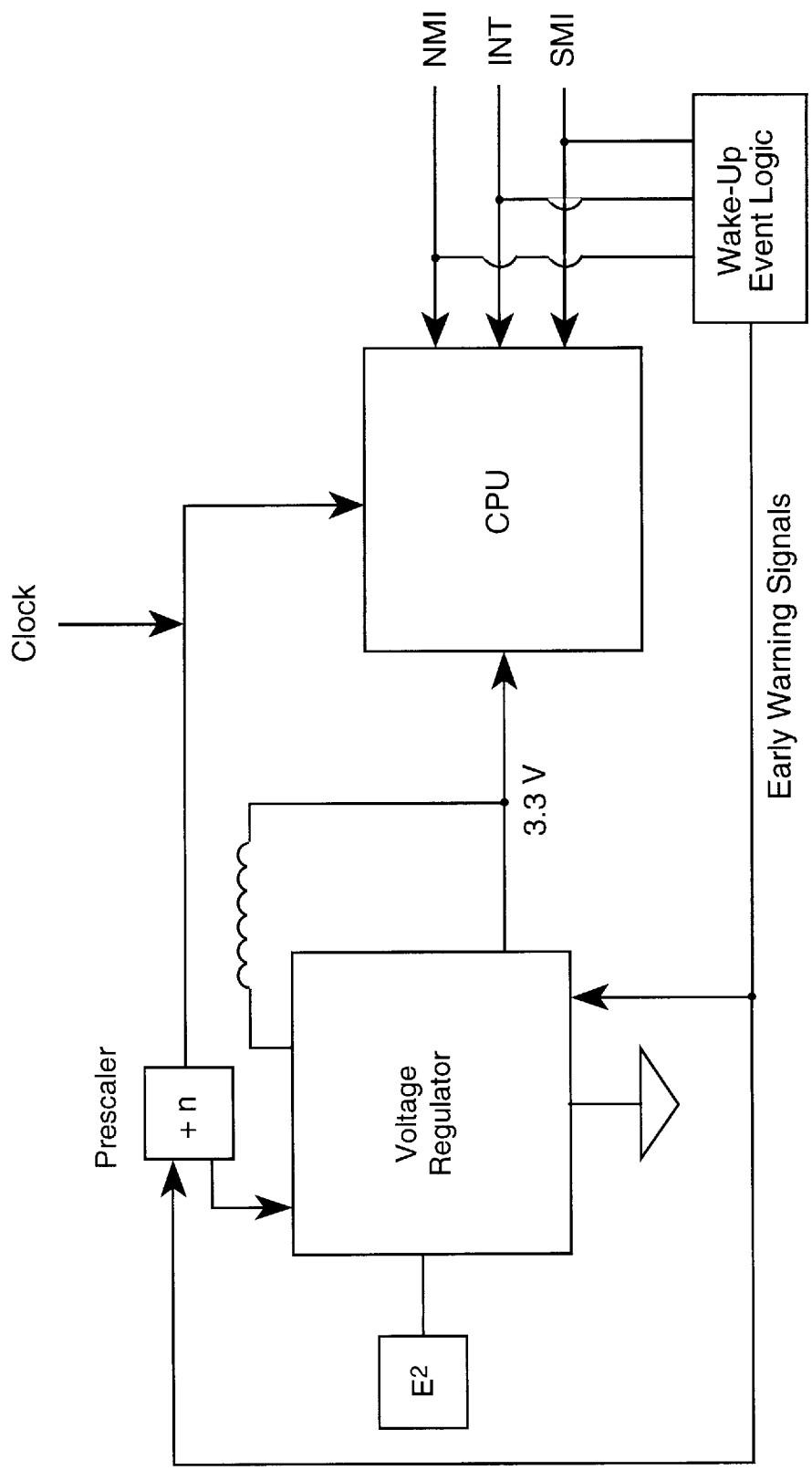
FIG. 6 shows an embodiment using a synchronous digital buck converter.

Second and third enhancements may be used when the first enhancement is in place. In FIG. 6, the second enhancement uses a synchronous digital Buck converter running on a divided CPU clock. To allow the prewarning logic to work properly, the divider must be synchronized as well.

Figure 7:
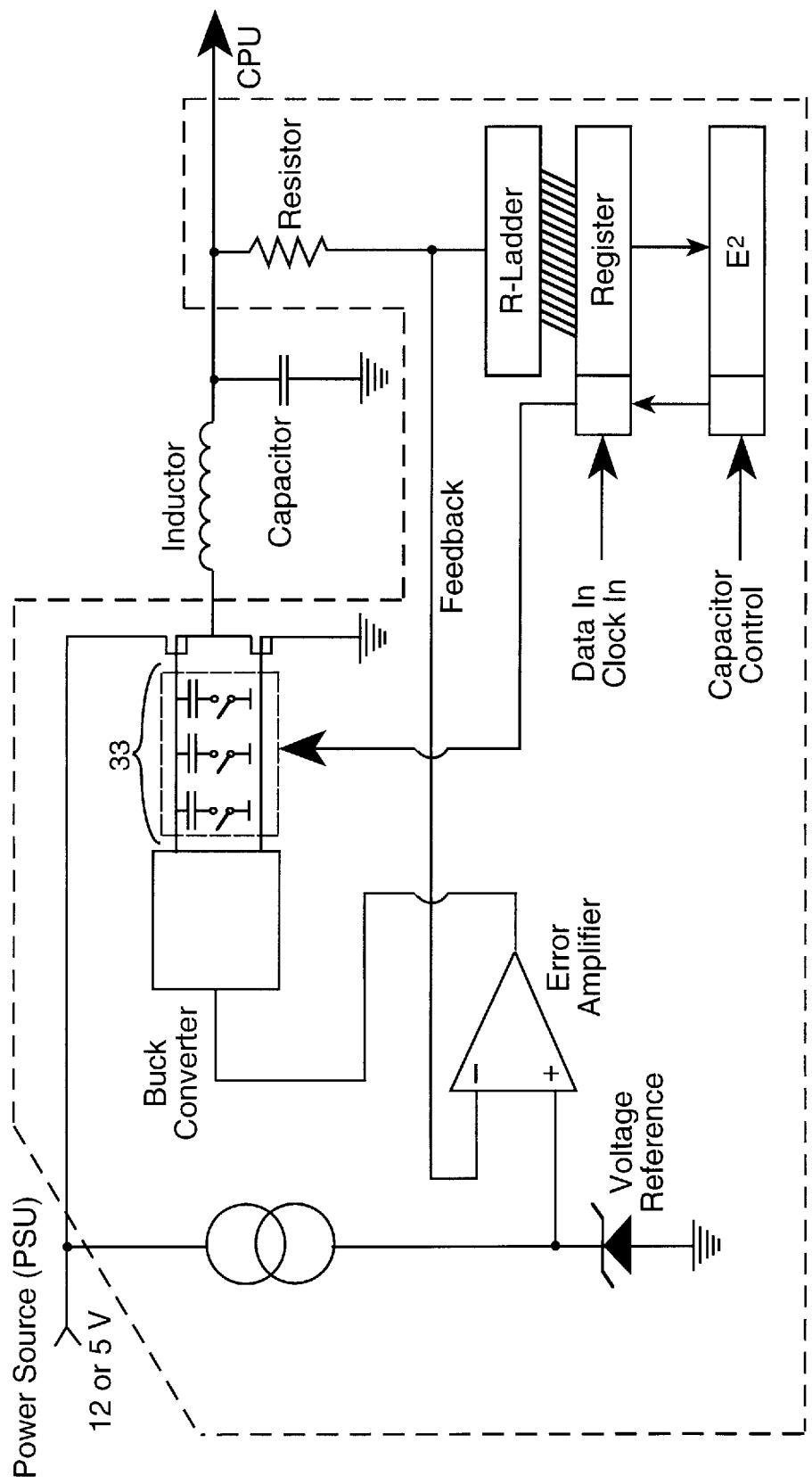
FIG. 7 shows an embodiment incorporating a series of dummy capacitors, controlled by a EEPROM for slowing the rise time of the switching regulator and inductor to match the CPU rise time.

A third enhancement (see FIG. 7) uses a series of dummy capacitors 33, controlled by the $E^2$, to slow the rise time of the switching regulator and inductor to match the CPU rise time.

It will be apparent to those with skill in the art that there are many alterations that may be made without departing from the spirit and scope of the invention. There are, for example, many equivalent ways the circuitry elements might be arranged to produce essentially the same result, and there are many ways IC elements might be arranged as well.

What is claimed is:

1. A voltage regulated, single chip, microprocessor-based CPU for a general-purpose computer, comprising:
   a CPU portion; and
   a switching voltage regulator portion having a primary input and a regulated output connected to the CPU portion;
   wherein the switching voltage regulator portion comprises:
      switching circuitry connected between the primary input and the regulated output, for altering voltage at the regulated output; and
      adjustment circuitry comprising an electrically erasable programmable read-only memory (EEPROM), a digital register settable by a serial data stream transfer circuitry for transferring a digital value from the digital register to the EEPROM, the adjustment circuitry connected to the switching circuitry and to the regulated output;
   wherein the digital value controls a resistor ladder (R-Ladder) to manage feedback voltage to the adjustment circuitry, and wherein the adjustment circuitry controls the switching circuitry to provide a voltage magnitude at the regulated output according to a value stored in the EEPROM.

2. A voltage-regulated, single chip, microprocessor-based CPU for a general-purpose computer, comprising:
   a CPU portion;
   a switching voltage regulator portion having a primary input and a regulated output connected to the CPU portion; and
   a wakeup logic circuit coupled to interrupt lines coupled to the CPU portion and to the voltage regulator portion, wherein interrupt activity is signaled to the voltage regulator portion
   wherein the switching voltage regulator portion comprises:
      switching circuitry including a buck converter connected between the primary input and the regulated output, for altering voltage at the regulated output; and
      adjustment circuitry including an electrically erasable programmable read-only memory (EEPROM), the adjustment circuitry connected to the switching circuitry and to the regulated output;
   wherein the adjustment circuitry controls the switching circuitry to provide a voltage magnitude at the regulated output according to a value stored in the EEPROM, and wherein the wakeup logic circuit controls a divided CPU clock connected to the CPU and to the buck converter.

3. A voltage-regulated CPU as in claim 2 comprising a set of capacitors in the buck converter, the set of capacitors switched in as needed by output from the EEPROM to slow rise time of the switching voltage regulator portion to match rise time of the CPU portion.

4. A switching voltage regulator having a primary input and a regulated output, comprising:
   switching circuitry connected between the primary input and the regulated output, for altering voltage at the regulated output; and
   adjustment circuitry comprising an electrically erasable programmable read-only memory (EEPROM), a digital register settable by a serial data stream, and transfer circuitry for transferring a digital value from the digital register to the EEPROM, the adjustment circuitry connected to the switching circuitry and to the regulated output;
   wherein the digital value controls a resistor ladder (R-Ladder) to manage feedback voltage to the adjustment circuitry, and wherein the adjustment circuitry controls the switching circuitry to provide a voltage magnitude at the regulated output according to a value stored in the EEPROM.

5. A switching voltage regulator having a primary input and a regulated output, comprising:
   switching circuitry connected between the primary input and the regulated output, for altering voltage at the regulated output;
   adjustment circuitry including an electrically erasable programmable read-only memory (EEPROM), the adjustment circuitry connected to the switching circuitry and to the regulated output; and
   a wakeup logic circuit coupled to the voltage regulator, and having input lines configured to couple to interrupt lines coupled to a CPU, wherein interrupt activity is signaled to the voltage regulator so the voltage regulator may prepare for incipient CPU activity and wherein the wakeup logic circuit controls a divided CPU clock connectable to the CPU and connected to the buck converter.

6. A switching voltage regulator as in claim 5 comprising a set of capacitors in the buck converter, the set of capacitors switched in as needed by output from the EEPROM to slow rise time of the switching voltage regulator to match rise time of the CPU.

7. A switching voltage regulator as in claim 5 wherein the regulator and all its elements are integrated on a single semiconductor chip.

* * * * *